US012749145B2

(12) United States Patent
Maheshwari et al.

(10) Patent No.: US 12,749,145 B2
(45) Date of Patent: Sep. 29, 2026

(54) SYSTEM AND METHOD TO PROVIDE PANORAMIC FEED CORRESPONDING TO AN ORIENTATION OF A USER DEVICE

(71) Applicant: E-CON SYSTEMS INDIA PRIVATE LIMITED, Chennai (IN)

(72) Inventors: Maheshwari, Chennai (IN); Gomathi Sankar, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 352 days.

(21) Appl. No.: 18/613,295

(22) Filed: Mar. 22, 2024

(65) Prior Publication Data

US 2025/0296237 A1 Sep. 25, 2025

(51) Int. Cl.

*G06T 3/4038* (2024.01)
*B25J 9/16* (2006.01)
*H04N 5/265* (2006.01)
*H04N 23/695* (2023.01)

(52) U.S. Cl.

CPC ........... *G06T 3/4038* (2013.01); *B25J 9/1697* (2013.01); *H04N 5/265* (2013.01); *H04N 23/695* (2023.01)

(58) Field of Classification Search

None

See application file for complete search history.

(56) References Cited

U.S. PATENT DOCUMENTS

| | | | | |
|---|---|---|---|---|
| 9,479,732 | B1 | 10/2016 | Saleh et al. | |
| 10,848,731 | B2 | 11/2020 | Simek et al. | |
| 11,282,287 | B2 | 3/2022 | Gausebeck | |
| 2011/0173565 | A1 * | 7/2011 | Ofek | G09B 29/00 715/781 |
| 2020/0264695 | A1 * | 8/2020 | Sanjoto | G06F 3/00 |
| 2022/0050473 | A1 | 2/2022 | Pärnpuu et al. | |

FOREIGN PATENT DOCUMENTS

| | | | | |
|---|---|---|---|---|
| CN | 107433905 A | * | 12/2017 | H04N 7/181 |
| CN | 108377345 A | * | 8/2018 | H04N 23/73 |

* cited by examiner

*Primary Examiner* — Bernard Krasnic

(74) *Attorney, Agent, or Firm* — Jason C. Cameron

(57) ABSTRACT

A system to provide a panoramic feed corresponding to an orientation of a user device is disclosed. The system includes a processing subsystem including an image acquisition module to receive a corresponding visual feed from image sensors. The processing subsystem includes a feed rectification module is configured to rectify one or more anomalies in the visual feed to obtain a rectified feed. The processing subsystem includes an estimation module to estimate a homography matrix for each pair of the rectified feed. The processing subsystem includes a panorama generation module to blend each pair of the corresponding rectified feed based on the homography matrix to obtain the panoramic feed. The processing subsystem includes a viewpoint rendering to evaluate at least one viewpoint based on orientation parameters received from the user device. The viewpoint rendering module is to render a predefined field of view of the panoramic feed in the user device.

19 Claims, 6 Drawing Sheets

SYSTEM AND METHOD TO PROVIDE PANORAMIC FEED CORRESPONDING TO AN ORIENTATION OF A USER DEVICE

FIELD OF INVENTION

Embodiments of the present disclosure relate to a field of image processing and more particularly to a system and method to provide a panoramic feed corresponding to an orientation of a user device.

BACKGROUND

A robot is a machine designed to perform physical tasks and manipulate objects. The robot interacts with and responds to an environment through sensors, actuators, and control systems associated with the robot. The robot is used in various fields such as manufacturing, industrial automation, logistics, warehousing, agriculture, medical and healthcare. Operators rely on a visual feed of the environment from the robot to operate the robot remotely.

Conventionally, the robot utilizes a camera mounted on a rotatable head to acquire the visual feed of the environment. The rotatable head is subjected to wear and tear, and cables associated with the rotatable head are prone to stretching and twisting, leading to significant maintenance costs and downtime. Further, the limited freedom of movement of the rotatable head leads to a restricted field of view of the camera, resulting in blind spots and reduced spatial awareness. Furthermore, lack of real-time synchronization between the camera and the visual feed hinders spatial awareness of the operators regarding the environment. Further, the robot lacks the ability to determine the distance between the robot and a target object, thereby making manipulation of the robot complex.

Hence, there is a need for a system and method to provide a panoramic feed corresponding to an orientation of a user device to address the aforementioned issue(s).

BRIEF DESCRIPTION

In accordance with an embodiment of the present disclosure, a system to provide a panoramic feed corresponding to an orientation of a user device is provided. The system includes a processing subsystem hosted on a server located on a robot and configured to execute on a network to control bidirectional communications among a plurality of modules. The processing subsystem includes an image acquisition module operatively coupled to at least three image sensors mounted on the robot at a predefined angle with respect to each other. The image acquisition module is configured to receive a corresponding visual feed from the at least three image sensors. The processing subsystem also includes a feed rectification module operatively coupled to the image acquisition module. The feed rectification module is configured to rectify one or more anomalies in each of the corresponding visual feed to obtain a corresponding rectified feed. The processing subsystem also includes an estimation module operatively coupled to the feed rectification module. The estimation module is configured to estimate a corresponding homography matrix for each pair of the corresponding rectified feed. The processing subsystem also includes a panorama generation module operatively coupled to the estimation module. The panorama generation module is configured to blend each pair of the corresponding rectified feed based on the corresponding homography matrix estimated to obtain the panoramic feed. The processing subsystem further includes a viewpoint rendering module operatively coupled to the panorama generation module. The viewpoint rendering module is configured to evaluate at least one viewpoint based on a plurality of orientation parameters received from the user device through the network. The viewpoint rendering module is also configured to render a predefined field of view of the panoramic feed obtained in the user device through the network based on the at least one viewpoint evaluated, thereby providing the panoramic feed based on the orientation of the user device.

In accordance with another embodiment of the present disclosure, a method to provide a panoramic feed corresponding to an orientation of a user device is provided. The method includes receiving, by an image acquisition module operatively coupled to at least three image sensors mounted on a robot at a predefined angle with respect to each other, a corresponding visual feed from the at least three image sensors. The method also includes rectifying, by a feed rectification module operatively coupled to the image acquisition module, one or more anomalies in each of the corresponding visual feed to obtain a corresponding rectified feed. The method also includes estimating, by an estimation module, a corresponding homography matrix for each pair of the corresponding rectified feed. The method also includes blending, by a panorama generation module operatively coupled to the estimation module, each pair of the corresponding rectified feed based on the corresponding homography matrix estimated to obtain the panoramic feed. The method also includes evaluating, by a viewpoint rendering module operatively coupled to the panorama generation module, at least one viewpoint based on a plurality of orientation parameters received from the user device through the network. The method further includes rendering, by the viewpoint rendering module, a predefined field of view of the panoramic feed obtained in the user device through the network based on the at least one viewpoint evaluated, thereby providing the panoramic feed based on the orientation of the user device.

In accordance with another embodiment of the present disclosure, a non-transitory computer-readable medium storing a computer program that, when executed by a processor, causes the processor to perform a method to provide a panoramic feed corresponding to an orientation of a user device is provided. The method includes receiving, by an image acquisition module operatively coupled to at least three image sensors mounted on a robot at a predefined angle with respect to each other, a corresponding visual feed from the at least three image sensors. The method also includes rectifying, by a feed rectification module operatively coupled to the image acquisition module, one or more anomalies in each of the corresponding visual feed to obtain a corresponding rectified feed. The method also includes estimating, by an estimation module, a corresponding homography matrix for each pair of the corresponding rectified feed. The method also includes blending, by a panorama generation module operatively coupled to the estimation module, each pair of the corresponding rectified feed based on the corresponding homography matrix estimated to obtain the panoramic feed. The method also includes evaluating, by a viewpoint rendering module operatively coupled to the panorama generation module, at least one viewpoint based on a plurality of orientation parameters received from the user device through the network. The method further includes rendering, by the viewpoint rendering module, a predefined field of view of the panoramic feed obtained in the user device through the network based on the at least one viewpoint evaluated, thereby providing the panoramic feed based on the orientation of the user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
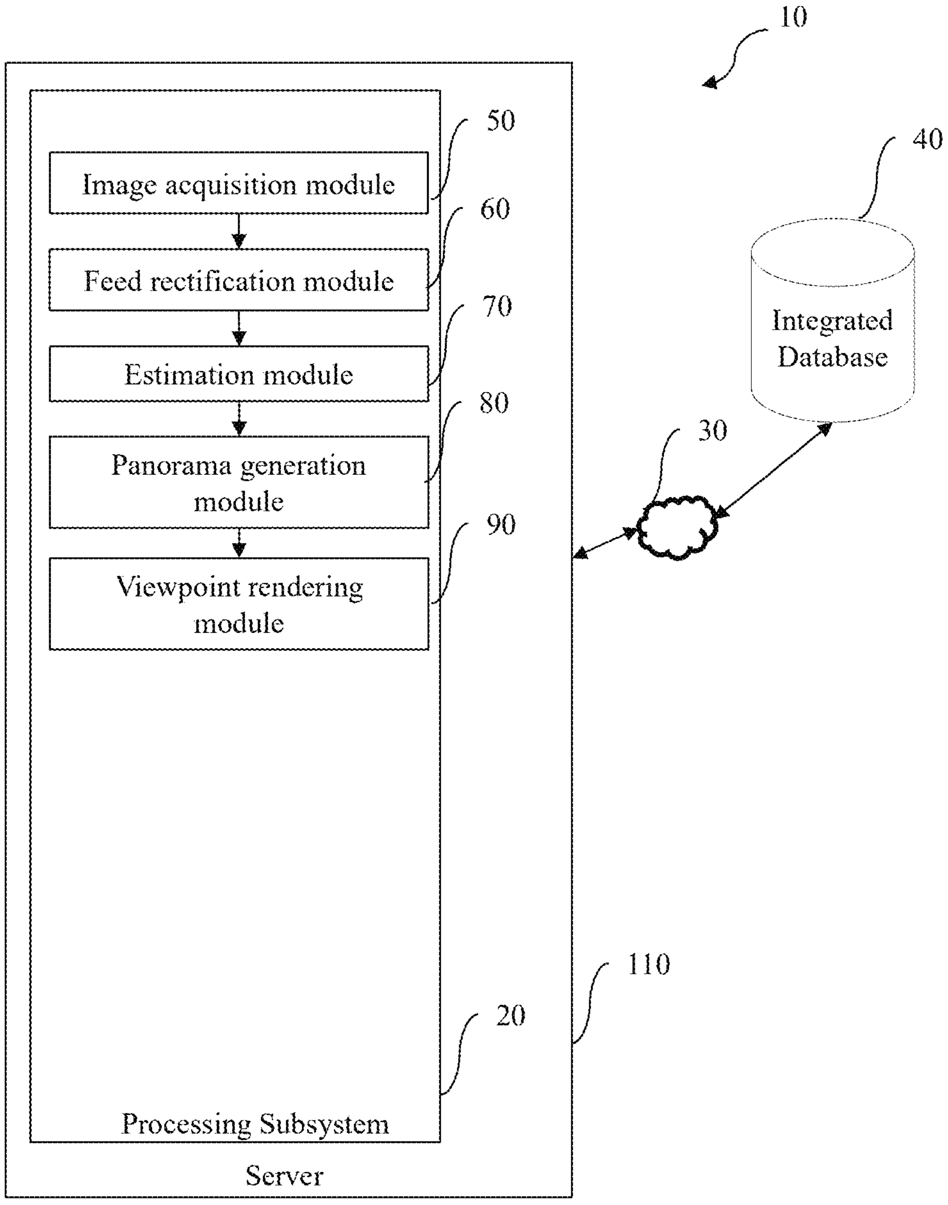
FIG. 1 is a block diagram representation of a system to provide a panoramic feed corresponding to an orientation of a user device in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to provide a panoramic feed corresponding to an orientation of a user device. The system includes a processing subsystem hosted on server located on a robot and configured to execute on a network to control bidirectional communications among a plurality of modules. The processing subsystem includes an image acquisition module operatively coupled to at least three image sensors mounted on the robot at a predefined angle with respect to each other. The image acquisition module is configured to receive a corresponding visual feed from the at least three image sensors. The processing subsystem also includes a feed rectification module operatively coupled to the image acquisition module. The feed rectification module is configured to rectify one or more anomalies in each of the corresponding visual feed to obtain a corresponding rectified feed. The processing subsystem also includes an estimation module operatively coupled to the feed rectification module. The estimation module is configured to estimate a corresponding homography matrix for each pair of the corresponding rectified feed. The processing subsystem also includes a panorama generation module operatively coupled to the estimation module. The panorama generation module is configured to blend each pair of the corresponding rectified feed based on the corresponding homography matrix estimated to obtain the panoramic feed. The processing subsystem further includes a viewpoint rendering module operatively coupled to the panorama generation module. The viewpoint rendering module is configured to evaluate at least one viewpoint based on a plurality of orientation parameters received from the user device through the network. The viewpoint rendering module is also configured to render a predefined field of view of the panoramic feed obtained in the user device through the network based on the at least one viewpoint evaluated, thereby providing the panoramic feed based on the orientation of the user device.

FIG. 1 is a block diagram representation of a system 10 to provide a panoramic feed corresponding to an orientation of a user device in accordance with an embodiment of the present disclosure. The system 10 includes a processing subsystem 20 hosted on a server 110 located on a robot (not shown in FIG. 1) and configured to execute on a network 30 to control bidirectional communications among a plurality of modules. As used herein, the robot may be defined as a machine designed to perform various tasks. In some embodiments, the robot may include a plurality of wheels to move from one place to another. In some embodiments, the robot may include at least one mechanical arm to pick and drop objects. In one embodiment, the network 30 may include one or more terrestrial and/or satellite networks interconnected to communicatively connect the user device to the robot. In one embodiment, the network 30 may include a local area network. In some embodiments, the network 30 may include a wide area network.

Further, in another embodiment, the network 30 may include both wired and wireless communications according to one or more standards and/or via one or more transport mediums. In one example, the network 30 may include wireless communications according to one of the 802.11 or Bluetooth specification sets, LoRa (Long Range Radio) or another standard or proprietary wireless communication protocol. In yet another embodiment, the network 30 may also include communications over a terrestrial cellular network, including, a GSM (global system for mobile communications), CDMA (code division multiple access), and/or EDGE (enhanced data for global evolution) network. In one embodiment, the plurality of module may be associated with an integrated database 40 to store a plurality of data being manipulated by the plurality of modules. In one embodiment, the integrated database 40 may include, but not limited to, an SQL database, a non-SQL database, a hierarchical database, a columnar database and the like.

Furthermore, the processing subsystem 20 includes an image acquisition module 50 operatively coupled to at least three image sensors mounted on the robot at a predefined angle with respect to each other. The image acquisition module 50 is configured to receive a corresponding visual feed from the at least three image sensors. In a specific embodiment, the predefined angle may include 120 degrees. In one embodiment, the at least three image sensors may include a corresponding fisheye lens. In some embodiments, the at least three image sensors may give a cumulative field of view including 360 degrees. In one embodiment, the at least 3 image sensors may include a corresponding camera. For example, consider a scenario in which, the robot may be positioned in a warehouse. The image acquisition module 50 may receive a 360 degree view of surroundings from a first image sensor, a second image sensor, and a third image sensor mounted on the robot.

Moreover, the processing subsystem 20 also includes a feed rectification module 60 operatively coupled to the image acquisition module 50. The feed rectification module 60 is configured to rectify one or more anomalies in each of the corresponding visual feed to obtain a corresponding rectified feed. In one embodiment, the one or more anomalies may include a tilt, shift and a distortion. In such an embodiment, the distortion may be caused due to a plurality of factors. The plurality of factors may include one or more distortions present in a lens associated with at least one of the at least three image sensors, and one or more irregularities present in the lens associated with at least one of the at least three image sensors. In some embodiments, the feed rectification module 60 is configured to rectify the one or more anomalies in each of the corresponding visual feed by adjusting each of the corresponding visual feed with respect to each other to position at least one object in each of the corresponding visual feed on a single horizontal line.

Additionally, in continuation with the ongoing example, consider the scenario in which an object lies in a field of view of the first image sensor and the second image sensor. The one or more anomalies with respect to the object may be noticeable in a first feed provided by the first image sensor and a second feed provided by the second image sensor. The feed rectification module 60 may leverage epipolar geometry concept to rectify the one or more anomalies. As used herein, the epipolar geometry relates to a geometry of the first image sensor and the second image sensor observing the object and assists establish correspondences between the object appearing in the first feed and the second feed. The feed rectification module 60 may define epipolar lines in each of the first feed and the second feed on which the object lies. The feed rectification module 60 may try to align the epipolar lines in the first feed and the second feed horizontally to rectify the one or more anomalies.

Also, the processing subsystem 20 includes an estimation module 70 operatively coupled to the feed rectification module 60. The estimation module 70 is configured to estimate a corresponding homography matrix for each pair of the corresponding rectified feed. In one embodiment, the estimation module 70 is configured to estimate the corresponding homography matrix by at least one of a technique including direct linear transform, random sample consensus, and normalized direct linear transform.

Further, in continuation with the ongoing example, the estimation module 70 may identify various key points in each the first feed and the second feed. The key points may refer to easily recognizable features in the first feed and the second feed. For case of understanding, the various key points in the first feed and the second feed may be termed as first set of key points and second set of key points here onwards. The estimation module 70 may compute feature vectors for each of the first set of key points and the second set of key points. The estimation module 70 may further match the first set of key points and the second set of key points to identify matching key points to estimate the homography matrix between the first feed and the second feed.

Furthermore, the processing subsystem 20 includes a panorama generation module 80 operatively coupled to the estimation module 70. The panorama generation module 80 is configured to blend each pair of the corresponding rectified feed based on the corresponding homography matrix estimated to obtain the panoramic feed. In continuation with the ongoing example, the panorama generation module 80 may apply the homography matrix to warp the second feed into a coordinate space of the first feed. The panorama generation module 80 may blend the first feed and the second feed there onwards to ensure a smooth transition from the first feed to the second feed, thereby obtaining the panoramic feed.

Moreover, the processing subsystem 20 includes a viewpoint rendering module 90 operatively coupled to the panorama generation module 80. The viewpoint rendering module 90 is configured to evaluate at least one viewpoint based on a plurality of orientation parameters received from the user device through the network 30. In some embodiments, the plurality of orientation parameters may include a pitch angle, a roll angle and a yaw angle, and the like. In one embodiment, the plurality of orientation parameters may be evaluated by at least one of an accelerometer and a gyroscope associated with the user device. In some embodiments, the user device may include a goggle, a tab, a computer and a phone. The viewpoint rendering module 90 is also configured to render a predefined field of view of the panoramic feed obtained in the user device through the network 30 based on the at least one viewpoint evaluated, thereby providing the panoramic feed based on the orientation of the user device. In one embodiment, the user device may include a display unit to display the panoramic feed rendered by the viewpoint rendering module 90. In one embodiment, the predefined field of view may include 120 degrees.

Additionally, in continuation of the ongoing example, consider a scenario in which a user X may be wearing the goggle capable of tracking head movements of the user X in terms of pitch angle, roll angle and yaw angle. At one instance, the viewpoint rendering module 90 may receive the pitch angle=0, the roll angle=0 and the yaw angle=0, from the goggle. The viewpoint rendering module 90 may evaluate the at least one viewpoint as a straight look from a perspective of the user X based on the pitch angle, roll angle and yaw angle received from the goggle. Consider another scenario in which the viewpoint rendering module 90 may receive the pitch angle=0, the roll angle=0 and the yaw angle=a positive value, from the goggle. The viewpoint rendering module 90 may evaluate the at least one viewpoint as a look towards right from the perspective of the user X based on the pitch angle, the roll angle and the yaw angle. Consider another scenario in which the viewpoint rendering module 90 may receive the pitch angle=0, the roll angle=0 and the yaw angle=a negative value, from the goggle. The viewpoint rendering module 90 may evaluate the at least one viewpoint as a look towards left from the perspective of the user X based on the pitch angle, the roll angle and the yaw angle.

Also. the viewpoint rendering module 90 may render the predefined field of view of the panoramic feed composed of the first feed and the second feed when the at least one viewpoint evaluated is the straight look from the perspective of the user X. Similarly, the viewpoint rendering module 90 may render the predefined field of view of the panoramic feed composed of the first feed and a third feed when the at least one viewpoint evaluated is the look towards right from the perspective of the user X. Third feed may be provided by a third image sensor placed at 120 degrees away from the first image sensor and the second image sensor. Also, the viewpoint rendering module 90 may render the predefined field of view of the panoramic feed composed of the second feed and the third feed when the at least one viewpoint evaluated is the look towards left from the perspective of the user X.

Figure 2:
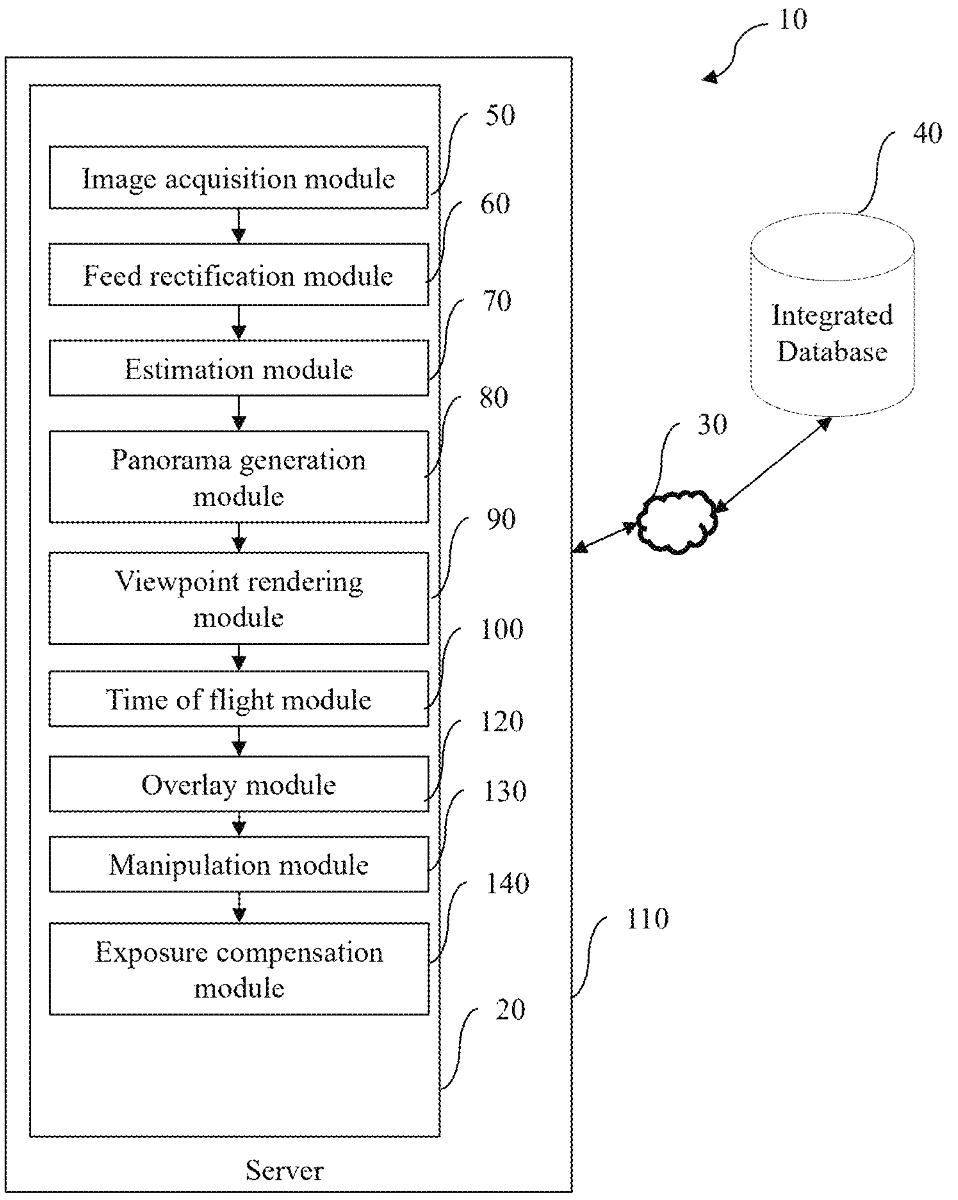
FIG. 2 is a block diagram representation of one embodiment of the system of FIG. 1, in accordance with an embodiment of the present disclosure.

FIG. 2 is a block diagram representation of one embodiment of the system 10 of FIG. 1, in accordance with an embodiment of the present disclosure. The system 10 of FIG. 1 includes the image acquisition module 50, the feed rectification module 60, the estimation module 70, the panorama generation module 80 and the viewpoint rendering module 90. In one embodiment, the system 10 of FIG. 1 may include the processing subsystem 20 including a time of flight module 100 configured to estimate a distance between the robot and a target object based on one or more inputs provided by a time of flight sensor positioned on the robot. In such an embodiment, the one or more input may include a time period. In one embodiment, the time of flight sensor may include, a light emitter, a light receiver and a clock.

Further, in continuation with the ongoing example, consider a scenario in which the robot is moving towards the object. An infrared light emitted by the light emitter may get reflected back from the object and captured by the light receiver. The clock may measure a time period between an instant at which the infrared light got emitted by the light emitter and the instant at which the reflected light got captured by the light receiver. The time of flight module 100 may estimate the distance between the robot and the object based on the time period measured by the clock.

Furthermore, in some embodiments, the processing subsystem 20 may include an overlay module 120 configured to overlay the distance estimated by the time of flight module 100 on the panoramic feed rendered to provide spatial awareness to a user possessing the user device regarding the surroundings of the robot. In continuation with the ongoing example, the overlay module 120 may overlay the distance between the robot and the object on the panoramic feed rendered by the viewpoint rendering module 90 so that the user X may assess whether the robot is moving closer to the object.

Additionally, in a specific embodiment, the processing subsystem 20 may include a manipulation module 130 configured to manipulate the robot by providing one or more control signals to the robot corresponding to one or more inputs provided by the user based on a distance estimated by the time of flight module 100, and the predefined field of view of the panoramic feed rendered by the viewpoint rendering module 90. In such an embodiment, the one or more inputs may include at least one of a voice command and a gesture command. In continuation with the ongoing example, the manipulation module 130 may manipulate the robot based on the voice command from the user X through a microphone associated with the user device. Based on the voice command, the manipulation module 130 may provide the one or more control signals to the robot to navigate the robot through the warehouse, actuate the mechanical arm and the like.

Also, in some embodiments, the processing subsystem 20 may include an exposure compensation module 140 operatively coupled to the image acquisition module 50. In such an embodiment, the exposure compensation module 140 may be configured to evaluate an average exposure around the at least three image sensors based on an exposure level at a plurality of points in the corresponding visual feed. The exposure compensation module 140 may also be configured to modify one or more parameters of each of the at least three image sensors based on the average exposure evaluated to obtain a uniform exposure in the corresponding visual feed. In one embodiment, the one or more parameters may include aperture, shutter speed, iso sensitivity, gain, amplification, and white balance.

Also, in continuation with the ongoing example, consider a scenario in which the first feed may have significant exposure, and the second and third feed may have poor exposure. The exposure compensation module 140 may measure exposure at the plurality of points which lie in the first feed, the second feed and the third feed to evaluate the average exposure. The exposure compensation module 140 may reduce the iso sensitivity of the first image sensor along with increasing the iso sensitivity of the second image sensor and the third image sensor to obtain the uniform exposure in the first feed, the second feed and the third feed.

Figure 3:
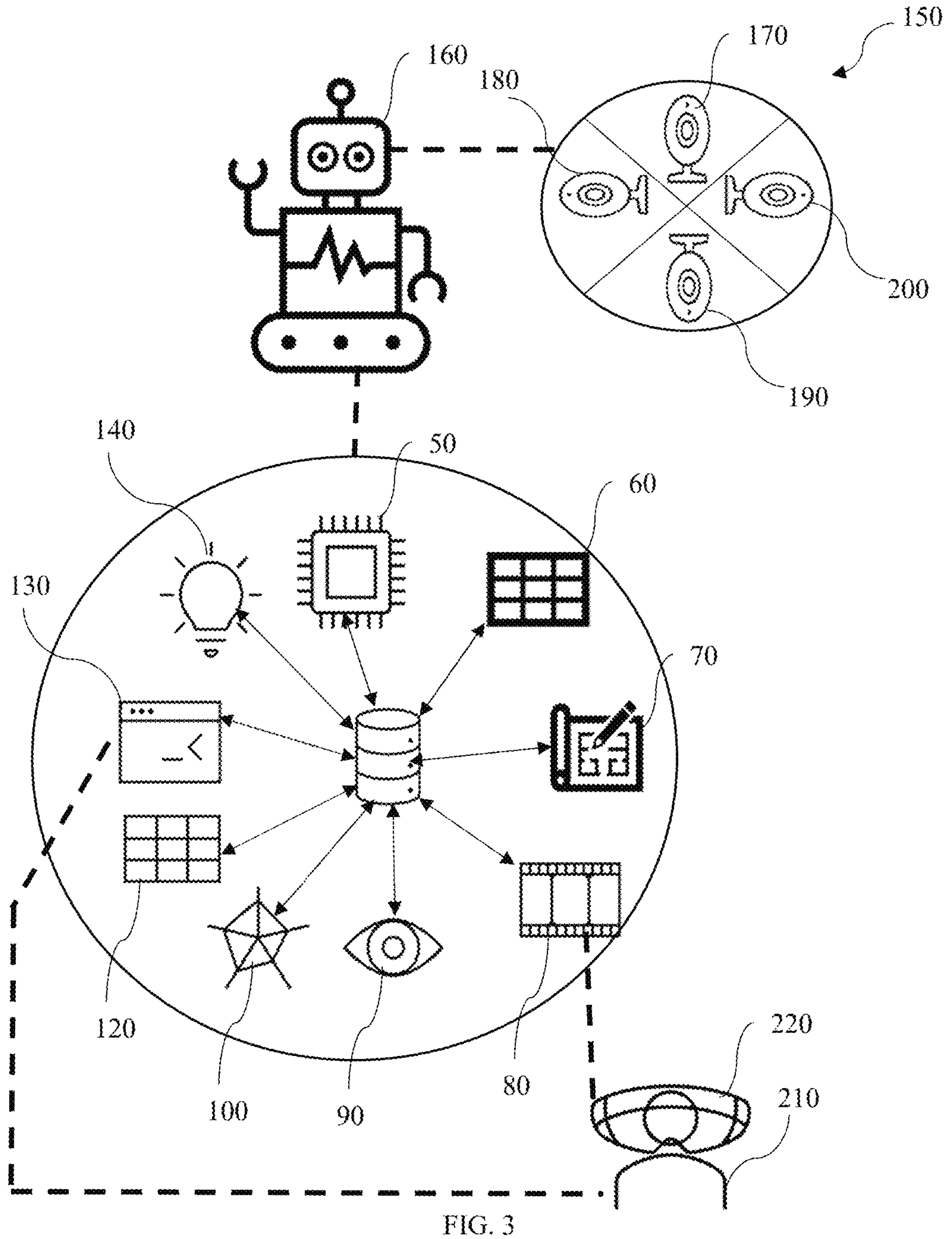
FIG. 3 is a schematic representation of an exemplary embodiment of the system of FIG. 1, in accordance with an embodiment of the present disclosure.

FIG. 3 is a schematic representation of an exemplary embodiment 150 of the system 10 of FIG. 1 in accordance with an embodiment of the present disclosure. Consider a scenario in which the robot 160 is located in a medical facility. The robot may have four image sensors having a field of view of 90 degrees each thereby covering 360 degrees around the robot. The first image sensor 170, the second image sensor 180, the third image sensor 190 and a fourth image sensor 200 may be configured to provide the first feed, the second feed, the third feed and a fourth feed respectively. The first feed, the second feed, the third feed and the fourth feed may be a visual feed from frontside of the robot, left side of the robot, backside of the robot, and right side of the robot respectively.

Further, the image acquisition module 50 may receive the first feed, the second feed, the third feed and the fourth feed. The exposure compensation module 140 may evaluate the average exposure around the first image sensor 170, the second image sensor 180, the third image sensor 190 and the fourth image sensor 200 based on the exposure level at the plurality of points in the first feed, the second feed, the third feed and the fourth feed. Consider a scenario in which the first feed may have an exposure above the average exposure evaluated by the exposure compensation module 140. The exposure compensation module 140 may adjust the gain of the first image sensor 170 to match the exposure of the first feed with the average exposure evaluated.

Furthermore, the feed rectification module 60 may rectify the tilt and the distortion between the first feed, the second feed, the third feed and the fourth feed by aligning the first feed, the second feed, the third feed and the fourth feed with respect to an epipolar line. Further, the estimation module 70 may estimate a first homography matrix for the first feed and the second feed. Similarly, the estimation module 70 may estimate a second homography matrix for the second feed and the third feed. The estimation module 70 may also estimate a third homography matrix for the third feed and the fourth feed. The Estimation module 70 may further estimate a fourth homography matrix for the fourth feed and the first feed. The panorama generation module 80 may combine the first feed, the second feed, the third feed and the fourth feed based on the first homography matrix, the second homography matrix, the third homography matrix and the fourth homography matrix to obtain the panoramic feed.

Moreover, consider a scenario in which an operator Y 210 may be wearing the goggle 220. The goggle 220 may be capable of tracking the head movements of the operator Y 210 in terms of the pitch angle, the roll angle and the yaw angle. The viewpoint rendering module 90 may evaluate the at least one viewpoint based on the pitch angle, the roll angle and the yaw angle received from the goggle 220. The viewpoint rendering module 90 may render the predefined field of view of the panoramic feed obtained in the goggle 220 through the network 30 based on the at least one viewpoint evaluated. Further, the time of flight module 100 may estimate the distance between the robot and various objects based on one or more inputs provided by the time of flight sensor positioned on the robot.

Additionally, the overlay module 120 may overlay the distance estimated by the time of flight module 100 on the panoramic feed rendered to provide spatial awareness to the operator Y 210. The manipulation module 130 may manipulate the robot by providing the one or more control signals to the robot corresponding to the one or more inputs provided by the operator Y 210 based on the distance estimated by the time of flight module 100, and the predefined field of view of the panoramic feed rendered by the viewpoint rendering module 90.

Figure 4:
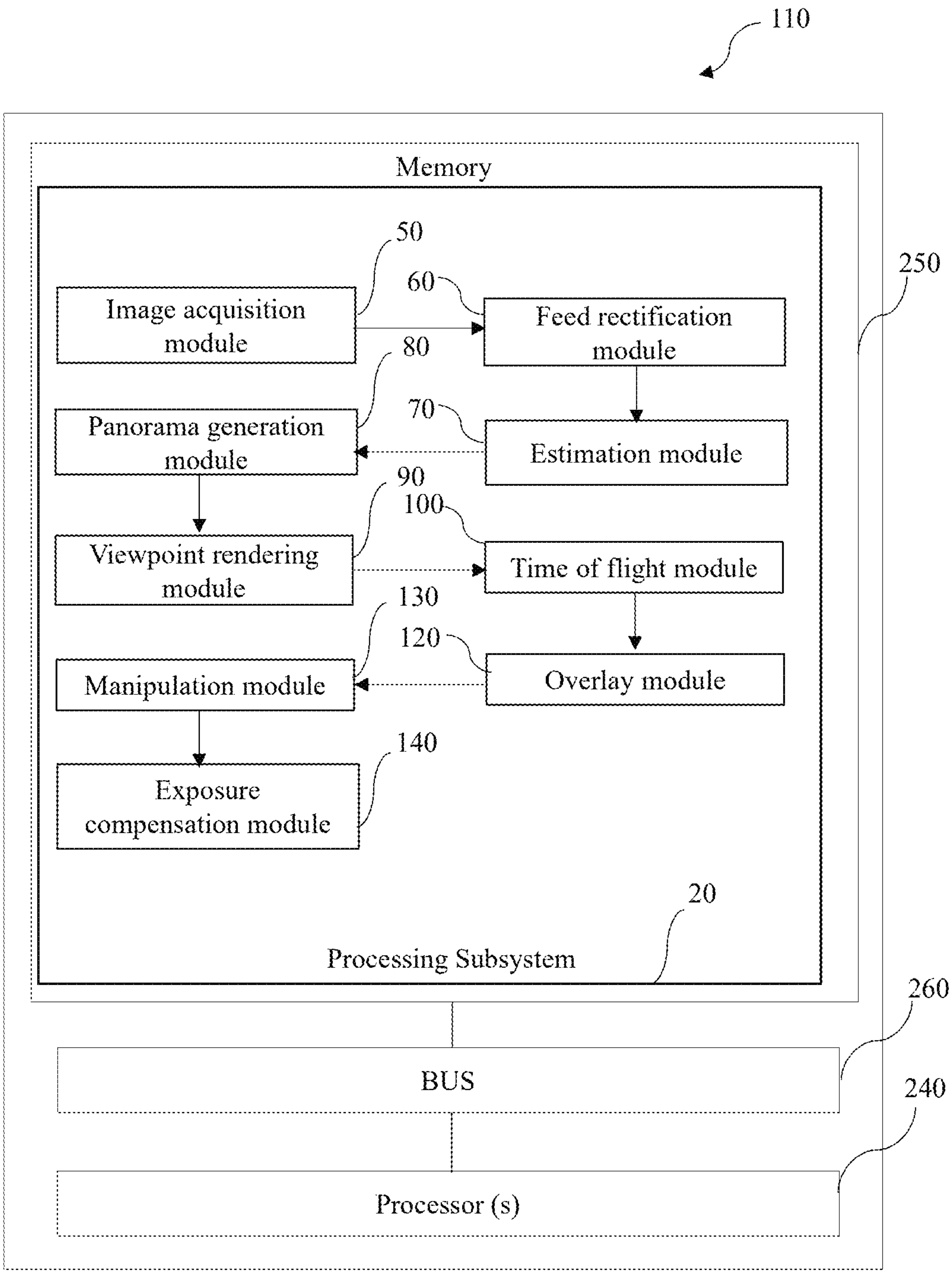
FIG. 4 is a block diagram of a computer or a server in accordance with an embodiment of the present disclosure.

FIG. 4 is a block diagram of a computer or a server 110 in accordance with an embodiment of the present disclosure. The server 110 includes processor(s) 240, and memory 250 operatively coupled to the bus 260. The processor(s) 240, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 250 includes several subsystems stored in the form of executable program which instructs the processor to perform the method steps illustrated in FIG. 1. The memory 250 is substantially similar to system 10 of FIG. 1. The memory 250 has the following subsystems: the processing subsystem 20 including the image acquisition module 50, the feed rectification module 60, the estimation module 70, the panorama generation module 80, the viewpoint rendering module 90, the time of flight module 100, the overlay module 120, the manipulation module 130, and the exposure compensation module 140. The plurality of modules of the processing subsystem 20 performs the functions as stated in FIG. 1 and FIG. 2. The bus 260 as used herein refers to be the internal memory channels or computer network that is used to connect computer components and transfer data between them. The bus 260 includes a serial bus or a parallel bus, wherein the serial bus transmit data in bit-serial format and the parallel bus transmit data across multiple wires. The bus 260 as used herein, may include but not limited to, a system bus, an internal bus, an external bus, an expansion bus, a frontside bus, a backside bus, and the like.

The processing subsystem 20 includes an image acquisition module 50 operatively coupled to at least three image sensors mounted on the robot at a predefined angle with respect to each other. The image acquisition module 50 is configured to receive a corresponding visual feed from the at least three image sensors. The processing subsystem 20 also includes a feed rectification module 60 operatively coupled to the image acquisition module 50. The feed rectification module 60 is configured to rectify one or more anomalies in each of the corresponding visual feed to obtain a corresponding rectified feed. The processing subsystem 20 also includes an estimation module 70 operatively coupled to the feed rectification module 60. The estimation module 70 is configured to estimate a corresponding homography matrix for each pair of the corresponding rectified feed. The processing subsystem 20 also includes a panorama generation module 80 operatively coupled to the estimation module 70. The panorama generation module 80 is configured to blend each pair of the corresponding rectified feed based on the corresponding homography matrix estimated to obtain the panoramic feed. The processing subsystem 20 further includes a viewpoint rendering module 90 operatively coupled to the panorama generation module 80. The viewpoint rendering module 90 is configured to evaluate at least one viewpoint based on a plurality of orientation parameters received from the user device through the network 30. The viewpoint rendering module 90 is also configured to render a predefined field of view of the panoramic feed obtained in the user device through the network 30 based on the at least one viewpoint evaluated, thereby providing the panoramic feed based on the orientation of the user device.

The processing subsystem 20 also includes a time of flight module 100 configured to estimate a distance between the robot and a target object based on one or more inputs provided by a time of flight sensor positioned on the robot.

The processing subsystem 20 also includes an overlay module 120 configured to overlay a distance estimated by a time of flight module 100 on the panoramic feed rendered to provide spatial awareness to a user possessing the user device regarding a region around the robot.

The processing subsystem 20 also includes a manipulation module 130 configured to manipulate the robot by providing one or more control signals to the robot corresponding to one or more inputs provided by a user based on a distance estimated by a time of flight module 100, and the predefined field of view of the panoramic feed rendered by the viewpoint rendering module 90.

The processing subsystem 20 also includes an exposure compensation module 140 operatively coupled to the image acquisition module 50. The exposure compensation module 140 is configured to evaluate an average exposure around the at least three image sensors based on an exposure level at a plurality of points in the corresponding visual feed. The exposure compensation module 140 is also configured to modify one or more parameters of each of the at least three image sensors based on the average exposure evaluated to obtain a uniform exposure in the corresponding visual feed.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 240.

Figure 5A:
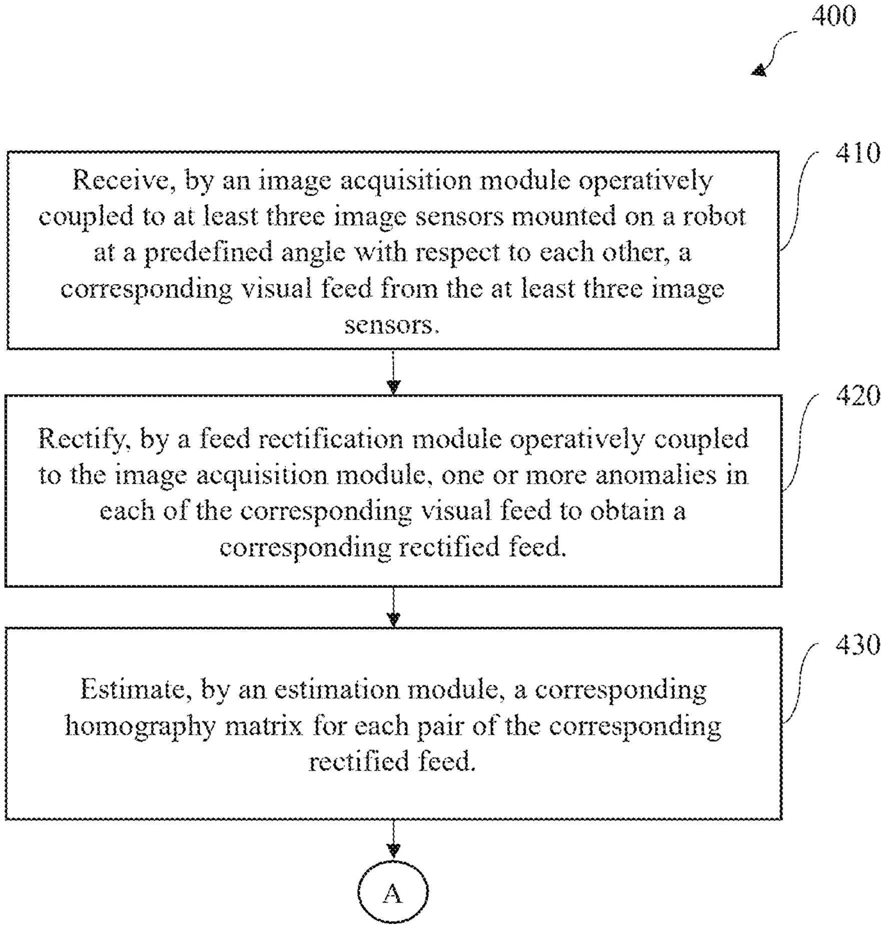
FIG. 5*a* is a flow chart representing the steps involved in a method to provide a panoramic feed corresponding to an orientation of a user device in accordance with an embodiment of the present disclosure.
Figure 5B:
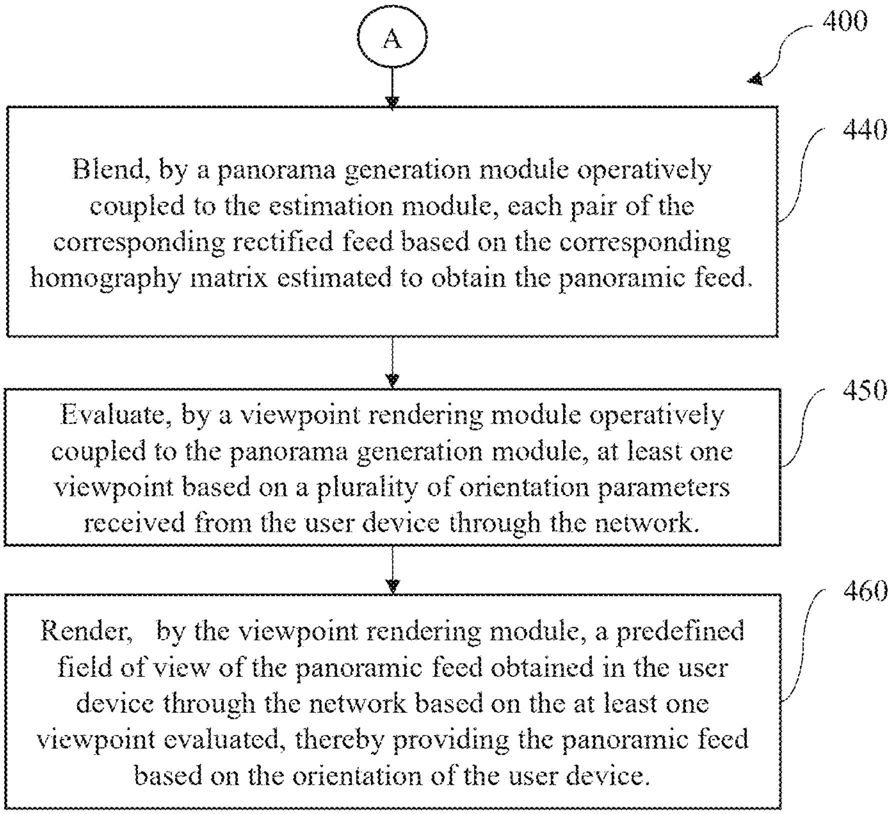
FIG. 5*b* is a flow chart representing the continued steps involved in a method of FIG. 5*a*, in accordance with an embodiment of the present disclosure.

FIG. 5*a* and FIG. 5*b* is a flow chart representing the steps involved in a method 400 to provide a panoramic feed corresponding to an orientation of a user device in accordance with an embodiment of the present disclosure. The method 400 includes receiving a corresponding visual feed from the at least three image sensors in step 410. In one embodiment, receiving a corresponding visual feed from the at least three image sensors includes receiving a corresponding visual feed from the at least three image sensors by an image acquisition module. In such an embodiment, the image acquisition module may be operatively coupled to at least three image sensors mounted on a robot at a predefined angle with respect to each other. In a specific embodiment, the predefined angle may include degrees. In one embodiment, the at least three image sensors may include a corresponding fisheye lens. In some embodiments, the at least three image sensors may give a cumulative field of view including degrees. In one embodiment, the at least 3 image sensors may include a corresponding camera.

The method 400 also includes rectifying one or more anomalies in each of the corresponding visual feed to obtain a corresponding rectified feed in step 420. In one embodiment, rectifying one or more anomalies in each of the corresponding visual feed to obtain a corresponding rectified feed includes rectifying one or more anomalies in each of the corresponding visual feed to obtain a corresponding rectified feed by a feed rectification module operatively coupled to the image acquisition module. In one embodiment, the one or more anomalies may include a tilt, shift, and a distortion. In such an embodiment, the distortion may be caused due to a plurality of factors. The plurality of factors may include one or more distortions present in a lens associated with at least one of the at least three image sensors, and one or more irregularities present in the lens associated with at least one of the at least three image sensors. In some embodiments, the feed rectification module is configured to rectify the one or more anomalies in each of the corresponding visual feed by adjusting each of the corresponding visual feed with respect to each other to position at least one object in each of the corresponding visual feed on a single horizontal line.

The method 400 also includes estimating a corresponding homography matrix for each pair of the corresponding rectified feed in step 430. In one embodiment, estimating a corresponding homography matrix for each pair of the corresponding rectified feed includes estimating a corresponding homography matrix for each pair of the corresponding rectified feed by an estimation module. In one embodiment, the estimation module is configured to estimate the corresponding homography matrix by at least one of a technique including direct linear transform, random sample consensus, and normalized direct linear transform.

The method 400 also includes blending each pair of the corresponding rectified feed based on the corresponding homography matrix estimated to obtain the panoramic feed in step 440. In one embodiment, blending each pair of the corresponding rectified feed based on the corresponding homography matrix estimated to obtain the panoramic feed includes blending each pair of the corresponding rectified feed based on the corresponding homography matrix estimated to obtain the panoramic feed by a panorama generation module operatively coupled to the estimation module.

The method 400 also includes evaluating at least one viewpoint based on a plurality of orientation parameters received from the user device through the network in step 450. In one embodiment, evaluating at least one viewpoint based on a plurality of orientation parameters received from the user device through the network includes evaluating at least one viewpoint based on a plurality of orientation parameters received from the user device through the network by a viewpoint rendering module. In some embodiments, the plurality of orientation parameters may include a pitch angle, a roll angle and a yaw angle, and the like. In one embodiment, the plurality of orientation parameters may be evaluated by at least one of an accelerometer and a gyroscope associated with the user device. In some embodiments, the user device may include a goggle, a tab, a computer and a phone.

The method 400 also includes rendering a predefined field of view of the panoramic feed obtained in the user device through the network based on the at least one viewpoint evaluated, thereby providing the panoramic feed based on the orientation of the user device in step 460. In one embodiment, rendering a predefined field of view of the panoramic feed obtained in the user device through the network based on the at least one viewpoint evaluated includes rendering a predefined field of view of the panoramic feed obtained in the user device through the network based on the at least one viewpoint evaluated by the viewpoint rendering module. In one embodiment, the user device may include a display unit to display the panoramic feed rendered by the viewpoint rendering module 90. In one embodiment, the predefined field of view may include 120 degrees.

Various embodiments of the system and method to provide the panoramic feed corresponding to the orientation of a user device described above enable various advantages. Provision of the at least three image sensors on the robot in combination with the image acquisition module, the feed rectification module, the estimation module, the panorama generation module and the viewpoint rendering module is capable of providing the panoramic feed of the surroundings to the user device without involving any mechanical movements of the at least three image sensors. By eliminating the mechanical movements, the system reduces wear and tear of a mounting head associated with the at least three image sensors. The system also prevents stretching and twisting the cables by eliminating the mechanical movements, which in turn reduces the downtime and the maintenance costs.

Further, the at least three image sensors are capable of providing a 360 degree field of view around the robot, thereby eliminating the blind spots along with imparting spatial awareness to the user who operates the robot. Furthermore, from a technical effect point of view, the implementation time required to perform the method steps included in the present disclosure by the one or more processors of the system is very minimal, thereby the system maintains very minimal operational latency and requires very minimal processing requirements. By maintaining the operational latency very minimal, the system is capable of providing real-time synchronization between the corresponding feeds and the panoramic feed rendered, thereby ensuring accurate manipulation of the robot.

Furthermore, the time of flight module is capable of estimating the distance between the robot and the target object accurately, thereby assisting the user to manipulate the robot efficiently. Further, the viewpoint rendering module is capable of rendering the predefined field of view of the panoramic feed in the user device corresponding to the orientation of the user device, thereby enabling the user to pan the panoramic feed effortlessly by changing the orientation of the user device. The overlay module is capable of overlaying the distance estimated by the time of flight module on the panoramic feed rendered, thereby providing enhanced situational awareness to the user. Further, the manipulation module is capable of manipulating the robot by providing one or more control signals to the robot corresponding to at least one of the voice command and the gesture command provided by the user, thereby providing flexibility to the user to manipulate the robot. Also, the exposure compensation module is capable of modifying the one or more parameters of each of the at least three image sensors to maintain the uniform exposure in the corresponding visual feed, thereby ensuring enhanced visibility of the corresponding visual feed.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. A system to provide a panoramic feed corresponding to an orientation of a user device comprising:

a processing subsystem hosted on a server located on a robot and configured to execute on a network to control bidirectional communications among a plurality of modules comprising:

an image acquisition module operatively coupled to at least three image sensors mounted on the robot at a predefined angle with respect to each other, wherein the image acquisition module is configured to receive a corresponding visual feed from the at least three image sensors;

a feed rectification module operatively coupled to the image acquisition module, wherein the feed rectification module is configured to rectify one or more anomalies in each of the corresponding visual feed to obtain a corresponding rectified feed;

an estimation module operatively coupled to the feed rectification module, wherein the estimation module is configured to estimate a corresponding homography matrix for each pair of the corresponding rectified feed;

a panorama generation module operatively coupled to the estimation module, wherein the panorama generation module is configured to blend each pair of the corresponding rectified feed based on the corresponding homography matrix estimated to obtain the panoramic feed;

a viewpoint rendering module operatively coupled to the panorama generation module, wherein the viewpoint rendering module is configured to:

evaluate at least one viewpoint based on a plurality of orientation parameters received from the user device through the network; and render a predefined field of view of the panoramic feed obtained in the user device through the network based on the at least one viewpoint evaluated, thereby providing the panoramic feed based on the orientation of the user device; and an exposure compensation module operatively coupled to the image acquisition module, wherein the exposure compensation module is configured to:

evaluate an average exposure around the at least three image sensors based on an exposure level at a plurality of points in the corresponding visual feed; and modify one or more parameters of each of the at least three image sensors based on the average exposure evaluated to obtain a uniform exposure in the corresponding visual feed.

2. The system of claim 1, wherein the at least three image sensors comprises a corresponding fisheye lens.

3. The system of claim 1, wherein the at least three image sensors comprises a cumulative field of view comprising 360 degrees.

4. The system of claim 1, wherein the predefined angle comprises 120 degrees.

5. The system of claim 1, wherein the one or more anomalies comprises a tilt, shift, and a distortion.

6. The system of claim 1, wherein the feed rectification module is configured to rectify the one or more anomalies in each of the corresponding visual feed by adjusting each of the corresponding visual feed with respect to each other to position at least one object in each of the corresponding visual feed on a single horizontal line.

7. The system of claim 1, wherein the estimation module is configured to estimate the corresponding homography matrix by at least one of a technique comprising direct linear transform, random sample consensus, and normalized direct linear transform.

8. The system of claim 1, wherein the predefined field of view comprises 120 degrees.

9. The system of claim 1, wherein the plurality of orientation parameters are evaluated by at least one of an accelerometer or a gyroscope associated with the user device.

10. The system of claim 1, wherein the user device comprises a goggle, a tab, and a phone.

11. The system of claim 1, wherein the network comprises a local area network.

12. The system of claim 1, wherein the network comprises a wide area network.

13. The system of claim 1, wherein the processing subsystem comprises a time of flight module configured to estimate a distance between the robot and a target object based on one or more inputs provided by a time of flight sensor positioned on the robot.

14. The system of claim 1, wherein the processing subsystem comprises an overlay module configured to overlay a distance estimated by a time of flight module on the panoramic feed rendered to provide spatial awareness to a user possessing the user device regarding a region around the robot.

15. The system of claim 1, wherein the processing subsystem comprises a manipulation module configured to manipulate the robot by providing one or more control signals to the robot corresponding to one or more inputs provided by a user based on a distance estimated by a time of flight module, and the predefined field of view of the panoramic feed rendered by the viewpoint rendering module.

16. The system of claim 15, wherein the one or more inputs comprises at least one of a voice command or a gesture command.

17. The system of claim 1, wherein the one or more parameters comprises aperture, shutter speed, iso sensitivity, gain, amplification, and white balance.

18. A method to provide a panoramic feed corresponding to an orientation of a user device comprising:

receiving, by an image acquisition module operatively coupled to at least three image sensors mounted on a robot at a predefined angle with respect to each other, a corresponding visual feed from the at least three image sensors;

rectifying, by a feed rectification module operatively coupled to the image acquisition module, one or more anomalies in each of the corresponding visual feed to obtain a corresponding rectified feed;

estimating, by an estimation module operatively coupled to the feed rectification module, a corresponding homography matrix for each pair of the corresponding rectified feed;

blending, by a panorama generation module operatively coupled to the estimation module, each pair of the corresponding rectified feed based on the corresponding homography matrix estimated to obtain the panoramic feed;

evaluating, by a viewpoint rendering module operatively coupled to the panorama generation module, at least one viewpoint based on a plurality of orientation parameters received from the user device through a network;

rendering, by the viewpoint rendering module, a predefined field of view of the panoramic feed obtained in the user device through the network based on the at least one viewpoint evaluated, thereby providing the panoramic feed based on the orientation of the user device;

evaluating, by an exposure compensation module operatively coupled to the image acquisition module, an average exposure around the at least three image sensors based on an exposure level at a plurality of points in the corresponding visual feed; and modifying, by the exposure compensation module, one or more parameters of each of the at least three image sensors based on the average exposure evaluated to obtain a uniform exposure in the corresponding visual feed.

19. A non-transitory computer-readable medium storing a computer program that, when executed by a processor, causes the processor to perform a method to provide a panoramic feed corresponding to an orientation of a user device, wherein the method comprises:

receiving, by an image acquisition module operatively coupled to at least three image sensors mounted on a robot at a predefined angle with respect to each other, a corresponding visual feed from the at least three image sensors;

rectifying, by a feed rectification module operatively coupled to the image acquisition module, one or more anomalies in each of the corresponding visual feed to obtain a corresponding rectified feed;

estimating, by an estimation module operatively coupled to the feed rectification module, a corresponding homography matrix for each pair of the corresponding rectified feed;

blending, by a panorama generation module operatively coupled to the estimation module, each pair of the corresponding rectified feed based on the corresponding homography matrix estimated to obtain the panoramic feed;

evaluating, by a viewpoint rendering module operatively coupled to the panorama generation module, at least one viewpoint based on a plurality of orientation parameters received from the user device through a network;

rendering, by the viewpoint rendering module, a predefined field of view of the panoramic feed obtained in the user device through the network based on the at least one viewpoint evaluated, thereby providing the panoramic feed based on the orientation of the user device;

evaluating, by an exposure compensation module operatively coupled to the image acquisition module, an average exposure around the at least three image sensors based on an exposure level at a plurality of points in the corresponding visual feed; and modifying, by the exposure compensation module, one or more parameters of each of the at least three image sensors based on the average exposure evaluated to obtain a uniform exposure in the corresponding visual feed.

* * * * *